April 29, 1958 — G. LAUER — 2,832,460
HALVED FRUIT TURNOVER APPARATUS
Filed Jan. 23, 1956 — 2 Sheets-Sheet 1
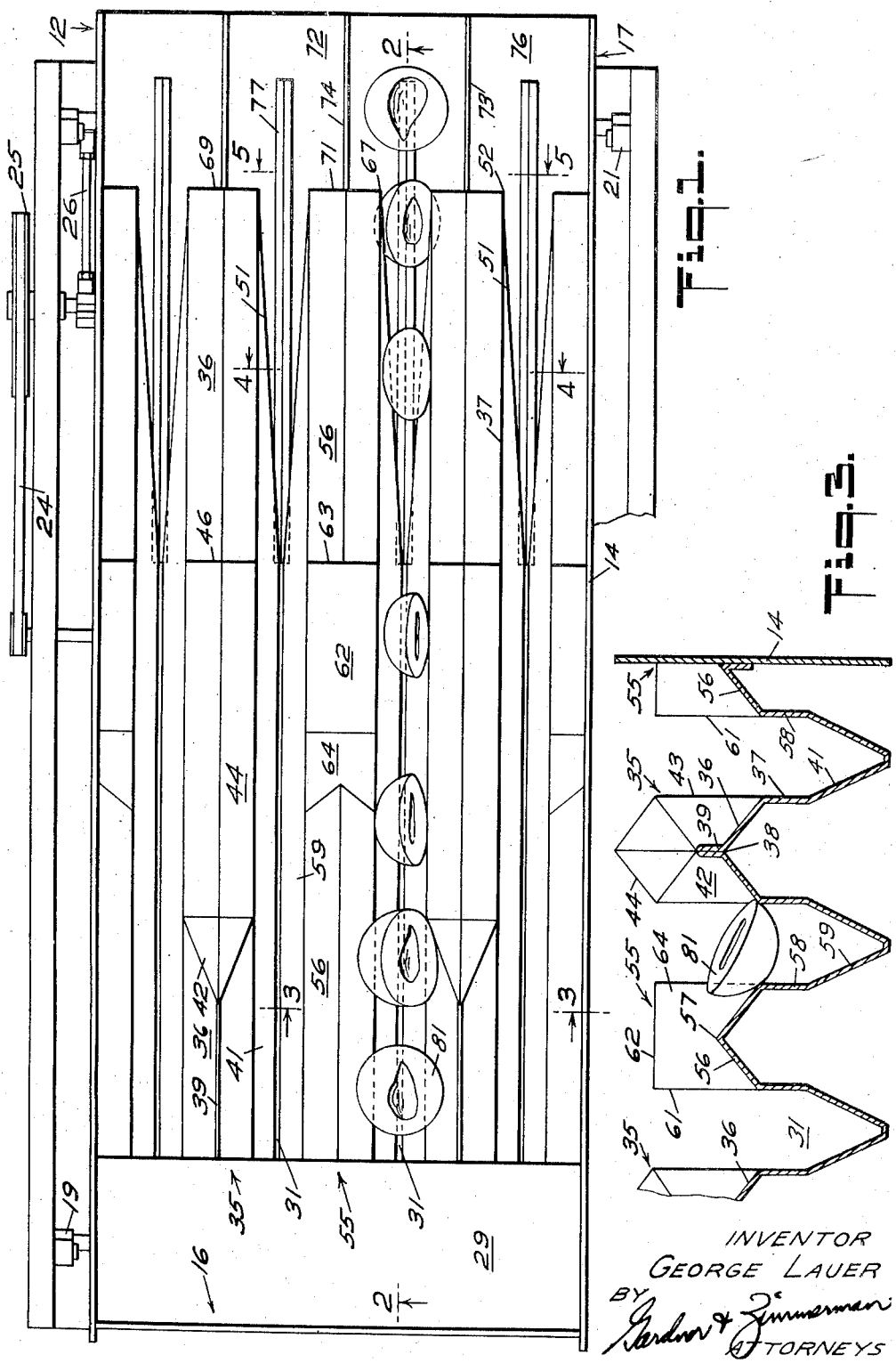
INVENTOR
GEORGE LAUER April 29, 1958　　　　G. LAUER　　　　2,832,460
HALVED FRUIT TURNOVER APPARATUS
Filed Jan. 23, 1956　　　　　　　　　　2 Sheets-Sheet 2
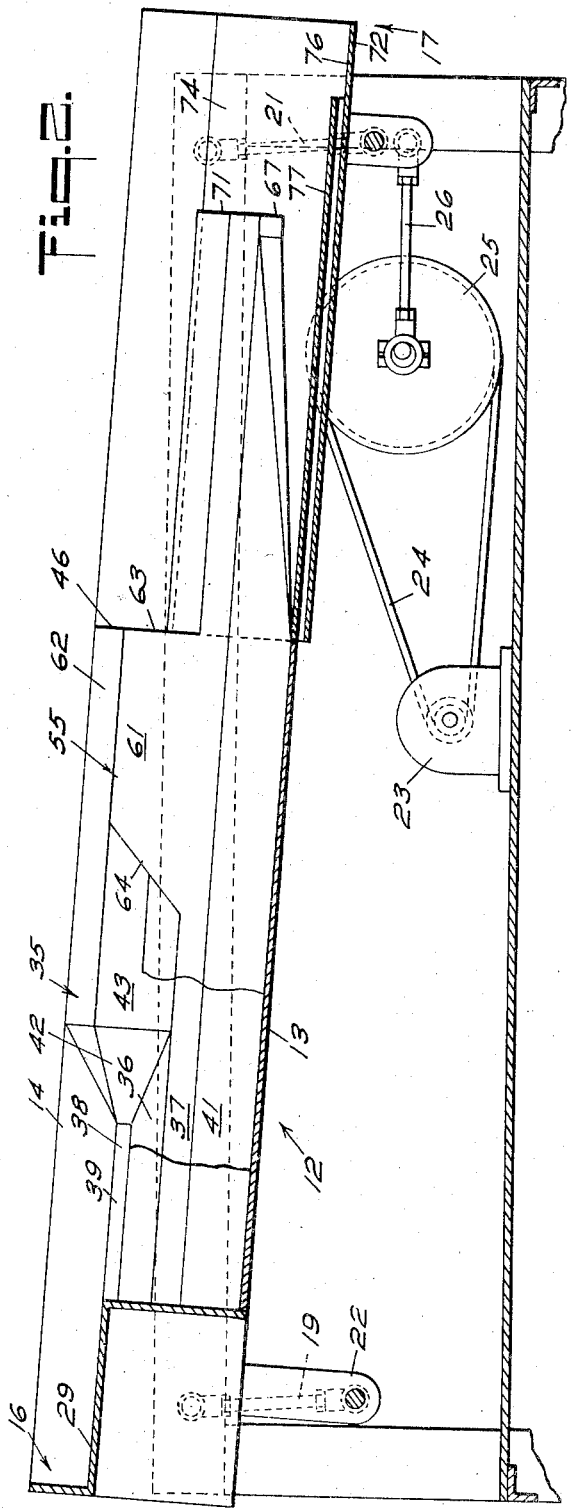
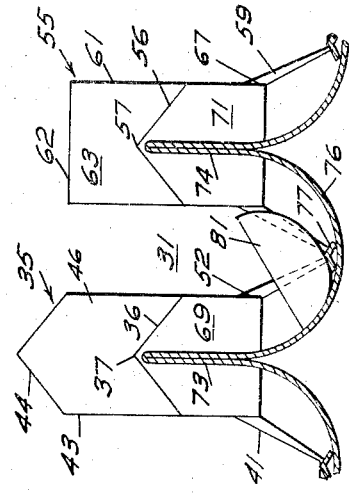
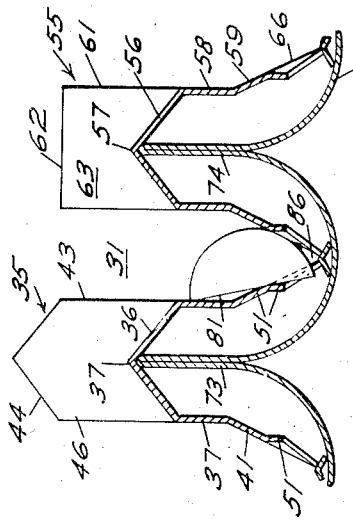
INVENTOR
GEORGE LAUER
BY
ATTORNEYS

United States Patent Office

2,832,460
Patented Apr. 29, 1958

2,832,460

HALVED FRUIT TURNOVER APPARATUS

George Lauer, Oakland, Calif.

Application January 23, 1956, Serial No. 560,659

14 Claims. (Cl. 198—33)

This invention relates to apparatus for orienting cut halved fruit such as peaches, apricots and the like, and is more specifically directed towards apparatus designed for positioning halved fruit with a cut face up position.

Turnover mechanisms may be broadly classified into those for receiving halved fruit and orienting the same in a cut face down or in a cut face up position. While the prior art discloses various machines adapted to perform the foregoing functions, they have not been completely satisfactory due to the fact that all of the halved fruit would not be delivered in the desired position, thereby requiring manual inspection at the discharge end of the machine. In connection with cut face down turnovers, the primary difficulty resided in the fact that many pieces of halved fruit would pass completely through the apparatus with their cut face uppermost and in a generally horizontal plane. To overcome this difficulty, I have ascertained that if the shaker table on which the fruit is deposited is first positioned with its cut face in a generally vertical plane, it then becomes relatively simple to tilt the fruit halves into a lowermost position. In my copending application, Serial No. 560,522, filed January 23, 1956, apparatus is disclosed for effecting the foregoing.

It might well be appreciated that while cut face down orientation involves the overcoming of certain problems, the situation is even more acute when it is desired to discharge fruit in a cut face up position. This is due to the fact that the shaker mechanism utilized to move the fruit halves along the supporting table imparts a rolling action to a fruit half supported on its arcuate surface, and in many cases can cause the fruit to roll into an undesired cut face down position. Also, in many prior machines, it was possible for the halves to move completely along the machine in a cut face down position and remain in such position until discharge.

Accordingly, it is an object of the present invention to provide apparatus for receiving indiscriminately positioned fruit halves and discharging such halves in a cut face up position.

Another object of this invention is to provide apparatus of the character described in which the fruit halves are first caused to assume a position with their cut faces generally vertically disposed from which they are then caused to move into a cut face up position.

A further object of the invention is to provide apparatus of the type referred to in which means are provided for insuring retention of the fruit halves in a cut face up position once they have achieved such a position.

Yet another object of the invention is to provide turnover apparatus as above described in which the fruit halves are moved without jamming and/or injury thereto.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings:

Figure 1 is a top plan view of the apparatus of the present invention.

Figure 2 is a longitudinal cross-sectional view taken substantially in the plane indicated by line 2—2 of Figure 1.

Figure 3 is a transverse cross-sectional view taken substantially in the plane indicated by line 3—3 of Figure 1.

Figure 4 is a transverse cross-sectional view taken substantially in the plane indicated by line 4—4 of Figure 1.

Figure 5 is a transverse cross-sectional view taken substantially in the plane indicated by line 5—5 of Figure 1.

In broad terms, the apparatus of the present invention is designed to receive large quantities of indiscriminately positioned fruit halves, first orient such halves with their cut faces in a generally vertical position, then cause the halves as they move longitudinally along the apparatus to slide along their rounded surface, and finally discharge the halves with their cut faces uppermost.

Referring now to the drawings, and more particularly to Figures 1 and 2 thereof, the apparatus includes a longitudinally extending table 12, having a bottom 13 and side walls 14, the table being inclined slightly downwardly from the receiving end 16 to the discharge end 17. As will be understood, the table is arranged to receive the fruit at end 16 and discharge the same from end 17, and therefore it is necessary to provide means cooperating with the downward inclination of the table for moving the fruit halves longitudinally along the table during which travel they are oriented in the manner above discussed. Such means may comprise a conventional shaker or oscillating mechanism, and accordingly the table is supported adjacent the ends thereof on generally vertically disposed links 19 and 21, said links being pivotally carried on suitable frame work 22. A motor 23, through a belt 24, drives a sheave 25, and the latter is provided with a crank arm 26 eccentrically carried by the sheave shaft. The distal end of arm 26 is pivotally connected to the table so that the action of the crank arm in combination with the pivotal supporting of the table on the links 19 and 21 results in the desired shaking or oscillation motion being imparted to the table whereby fruit halves will be moved from the receiving end to the discharge end thereof.

The receiving end of the table is provided with a generally planar apron 29 disposed above and in generally parallel relationship with the table bottom, and such apron is adapted to initially receive the fruit halves which are dumped or otherwise deposited thereon from any suitable source, From this apron, the fruit is caused to follow defined channels 31 or paths towards the discharge end of the apparatus, and these channels are so constructed that irrespective of the position of the halves when they are first deposited in the respective channels, they will emerge therefrom in cut face up relation.

Any suitable number of channels 31 may be provided and the particular form thereof will now be discussed. For reasons of explanation, and as illustrated in Figures 3 to 5 wherein the shape of the channels are best shown, the channels will be described in connection with the guide members positioned on opposite sides of the respective grooves. It will be made clear that each of the guide members is symmetrical about the longitudinal axis thereof whereby the one half of adjacent guide members actually constitutes each groove. Consequently the lateral outermost guide members may merely comprise a half of the width of the intermediate members.

Adjacent guide members are slightly different in construction, and alternate guide members 35 will be first described. Each of the members 35 is provided with a longitudinally extending upper surface 36 sloping laterally downwardly from the longitudinal axis thereof. At the edges of said surfaces, the latter merge with generally vertically disposed walls 37 generally coterminous with the length of surfaces 36. The general horizonal plane of the apex 38, formed at the juncture of the inclined surfaces 36 is slightly below the plane of apron 29, and a vertical wall 39 extends from the apron for a short distance along the apex 38 with its upper edge substantially at the elevation of the apron. Side walls 37 terminate in a laterally outwardly and downwardly inclined wall portion 41 preferably inclined at a smaller angle from the vertical than the upper supporting surfaces 36. The foregoing constructional details are best seen in Figure 3 of the drawings in cross-section, and by referring to Figures 1 and 2, it will be noted that this particular configuration extends for only a relative short distance from the apron 29 towards the discharge end of the apparatus. Then, the short wall 39 diverges laterally outwardly in both directions from the apex or longitudinal axis of member 35 to provide vertical walls 42 having a minimum height at their juncture with wall 39 and a maximum height where they terminate at the vertical planes defined by walls 37. The walls 42 then continue towards the discharge end 17 in coplanar relationship with walls 37 as indicated at 43 for a determined distance so as to substantially increase the groove height for the length thereof. The upper edges of walls 43 continue laterally upwardly and inwardly to provide inclined surfaces 44 lying in planes above and parallel to the planes defined by surfaces 36.

Walls 43 terminate at a generally vertical transverse end wall 46 while the upper surfaces 36 and their associated walls 37 continue on towards discharge end 13. It is important to note that at the transverse plane of end wall 46, the lowermost edges of inclined wall portions 41 extend to substantially the longitudinal axis of groove 31. However, each of such portions 41, as it continues towards table end 17, starts receding towards the axis of member 35 and defines a vertical wall 51 positioned laterally outwardly from wall 37 at said end wall 46 and converging towards wall 37 until it merges with the same as indicated at 52.

Reference will now be made to guide members 55 which alternate with members 35, just described. Each of the members 55 is provided with an upper surface 56 sloping laterally downwardly from the longitudinal axis thereof and extending in parallel spaced relation to surfaces 36 of member 35 with the longitudinal apex 57 lying in the same horizontal plane as apex 38. The edges of said surfaces meet with vertically disposed walls 58 in parallel spaced relation to walls 37. These side walls 58 terminate in laterally outwardly and downwardly inclined wall portions 59 which generally intersect wall portions 41 at the longitudinal axis of the groove. This cross-sectional configuration as seen in Figure 3 of the drawings continues longitudinally from apron 29 beyond the termination of wall 39. Then, the vertical wall portions 58, proceeding towards the discharge end 17, gradually increase in height until the maximum height of walls 61 is provided, such walls being coplanar with walls 58, and in opposed parallel relationship to walls 43. The upper edges of walls 61 may have a flat upper surface 62, and said walls terminate in a transverse end wall 63 lying in the plane of end wall 46 of member 35. The other end wall 64 lies in a transverse plane inclined upwardly from the surfaces 56 towards the upper surface 62.

Continuing beyond end wall 63, each of the wall portions 59 starts receding towards the axis of member 55 and defines a vertical wall positioned laterally outwardly from wall 58 at the end wall 63 and converging towards wall 58 until it merges with the latter as indicated at 67.

From the foregoing description, the change in cross-sectional form of each of the grooves 31 should be understood, and will be later discussed in more detail when a consideration of operation is given. However, at this time, it should be pointed out that members 35 and 55 terminate in generally vertical transverse walls 69 and 71 respectively, at the previously discussed junctures 52 and 67. Walls 69 and 71 are longitudinally spaced from the discharge apron 72 provided at the discharge end of the table and extending from such walls to the apron and along the respective axes of the members are generally vertical walls 73 and 74 joined by an arcuate bridge portion 76 to provide a generally U-shaped cross-sectional form having its upper edges aligned with the apexes 38 and 57, and its lower arcuate surface substantially below the members. Extending along the axis of the groove and adjacent the bottom thereof, I provide a strip 77 of inverted V-shaped cross-sectional form. With particular reference to Figure 2 of the drawings, it will be noted the strip 76 commences at the plane indicated by transverse walls 46 and 63 and is substantially immediately subjacent the members at such plane and is materially lower from the members at the ends 69 and 71 of the latter.

Now considering the operation of the apparatus, fruit halves are indiscriminately deposited on the receiving apron 29, and the downward slope of the table coupled with the oscillating motion imparted thereto causes the halves to fall onto the members 35 and 55 or into the groove 31 formed therebetween. The groove 31 adjacent the apron consists of opposed parallel side walls 37 and 58 having lower edge portions 41 and 59 converging towards the groove axis and upper edge portions 36 and 56 diverging from such axis, with portion 36 further having a short vertical wall 39 extending upwardly therefrom. The lateral spacing between opposed walls 37 and 58 is insufficient to let a fruit half fall therein unless the cut face 81 of the fruit is generally parallel and adjacent to one of such walls. In other words, such spacing is less than the diameter of the smallest fruit being processed. As previously explained, in orienting the fruit to a cut face up position, it is first desirable to position the halves with their cut faces in a generally vertical plane. Any fruit falling between walls 37 and 58 will of necessity assume such a position. However, as the fruit halves fall from apron 29, many of such pieces will fall onto the upper diverging surfaces 36 and 56 in either a cut face up or cut face down position, the wall 39 insuring movement of fruit which falls on the axis of member 35 towards the groove.

In absence of the vertical guides incorporated on the members, a fruit half such as shown in Figures 1 and 3 could undesirably remain in such position on the surfaces 36 and 56 for the entire length thereof. However, any such halves in advancing along the table, will engage wall 42 which will urge the half laterally therefrom and cause it to slide upwardly on surface 56. By the time the fruit reaches wall 43, the majority of halves will have fallen into groove 31. But for the isolated pieces which have a tendency to have an edge thereof slide along the juncture of coplanar wall portions 37 and 43 with their diametrically opposite edge supported on surface 56, these will likewise be deposited in the groove by the further tilting action effected by engagement with end wall 64 of member 55.

By the foregoing, it will be appreciated that all of the fruit halves prior to passing the transverse end walls 46 and 63 of the auxiliary guide members will be oriented with their cut faces vertical and disposed within a groove defined on one side by coplanar vertical wall portions 37 and 43 and on the other side by coplanar vertical wall portions 58 and 61, and on the bottom by V-shaped portions 41 and 59.

Upon passing end walls 46 and 63, the fruit halves will be restrained against further downward movement by the V-shaped wall portions 41 and 59. However, as best illustrated in Figure 4 of the drawings, wall portions 41 and 59 gradually incline upwardly and include the opposed vertical wall portions 51 and 66 which are of gradually increasing height and greater lateral spacing. Accordingly, the fruit halves, while remaining with their cut faces generally vertical will as they move along the table, gradually work themselves through the divergent slot 86 defined by wall portions 51 and 66. Upon passing through this slot they will fall into the U-shaped channel defined by portions 73, 74 and 76, and more particularly an arcuate portion of the half adjacent cut face 81 will first engage one or the other inclined surfaces of triangular strip 77, and gravital forces will cause the half to continue its downward movement to the position illustrated in Figure 5 with its cut face uppermost. After passing the strip 77, the U-shaped cross-sectional form of the channel will insure retention of the halves in said cut face up position until depositing of the same on the discharge apron 72.

From the foregoing, it should be appreciated that while the described apparatus is not complicated in either construction or operation, it fulfils a need for a turnover mechanism which can handle large quantities of fruit halves and successfully orient all of such halves into a cut face up position.

What is claimed is:

1. Apparatus of the character described comprising a longitudinally extending table, means on the upper surface of said table defining a longitudinally extending groove, said means including opposed generally parallel walls extending for a portion of the length of said groove, a second portion of the groove length being defined by opposed wall portions inclined laterally upwardly and diverging laterally from adjacent the axis of said groove, and a final portion of said groove having a generally U-shaped cross-sectional form of a width in excess of said other groove portions.

2. Apparatus as set forth in claim 1 including an inverted V-shaped element extending longitudinally along the bottom of said groove along at least a portion of the length of said second portion.

3. Apparatus for orienting halved fruit pieces comprising a longitudinally extending table having a receiving end and a discharge end, means defining a longitudinally extending channel between said ends, said channel adjacent said receiving end having opposed generally vertical walls with the upper edge portions thereof being inclined laterally outwardly and upwardly, and the lower edge portions thereof being inclined laterally inwardly and downwardly, the spacing between said vertical walls being less than the diameter of said halves and greater than the thickness thereof, said channel then having an axially aligned portion in which said vertical walls are substantially increased in height, and said channel having another axially aligned portion in which said lower inclined portions diverge from each other so as to define a slot of increasing width through which said halves may fall with the cut faces thereof in a generally vertical plane.

4. Apparatus as set forth in claim 3 including a generally U-shaped guide subjecent said slot for receiving fruit halves falling therethrough, and a shallow inverted V-shaped member extending along the bottom of said guide along the general axis of said groove.

5. Fruit half turnover apparatus comprising a longitudinally extending table, means imparting oscillating motion to said table, means on the upper surface of said table defining a longitudinally extending groove having opposed generally vertical side walls having upper edge portions inclined laterally outwardly and upwardly and lower edge portions inclined laterally inwardly and downwardly, means intermediate the ends of said groove including opposed guide walls extending upwardly in coplanar relationship with said vertical side walls and terminating above the height of said upper edge portions so as to increase the depth of said groove, one of said guide walls having an end portion tapering away from its opposed guide wall and from the axis of said groove, said lower edge portions diverging from each other adjacent the other end of said guide walls to define a slot of increasing width therebetween, and means subjacent said slot in alignment with said groove for receiving fruit halves passing through said slot, 6. Apparatus as set forth in claim 5 in which said end portion of said guide wall extends longitudinally beyond the other of said guide walls in a direction opposite to the divergence of said slot.

7. Apparatus for orienting halved fruit pieces comprising a longitudinally extending table having a receiving end and a discharge end, means defining a longitudnially extending channel between said ends, said channel having opposed generally vertical side walls having upper edge portions inclined laterally outwardly and upwardly and lower edge portions inclined laterally inwardly and downwardly, guide means intermediate the ends of said channel for guiding fruit halves into said channel with the cut faces thereof generally vertical and including vertically disposed wall portions extending upwardly from said vertical side walls and extending above the height of said upper edge portions, one of said wall portions having an end portion extending towards said receiving end in a laterally outward direction, the other of said wall portions having an end spaced from said receiving end at a greater distance than said first mentioned end portion and extending downwardly towards said receiving end, said guide means terminating in a generally transverse plane, said lower edge portions intermediate said guide means termination and said discharge end tapering laterally outwardly towards said vertical side walls to define a slot diverging towards said discharge end through which said halves may pass, a generally U-shaped member positioned subjecent said slot and having a width substantially greater than the spacing between said vertical side walls, and a shallow inverted V-shaped element disposed on said U-shaped member subjacent said slot.

8. Apparatus as set forth in claim 7 in which said latter element terminates short of the end of said U-shaped member, and a generally planar member generally aligned with said U-shaped member for receiving fruit halves discharged from the latter.

9. Apparatus of the character described comprising a longitudinally extending table, means on the upper surface of said table defining a longitudinally extending groove, said groove having a first portion with opposed side walls, a second portion in which the height of said side walls is increased, and other portion in which means are provided defining a divergent slot between said side walls, and longitudinally extending arcuately shaped receiving means positioned subjacent said slot, the width of said second portion being less than the diameter of a fruit half to be processed and greater than the thickness thereof.

10. Apparatus as set forth in claim 3 in which said slot is sloped upwardly towards the discharge end of said table.

11. Apparatus as set forth in claim 5 in which the vertical spacing between said lower edge portions of said walls and said receiving means increases substantially proportionately to the increase in the width of said slot.

12. Apparatus as set forth in claim 9 in which said opposed side walls defining said first groove portion have upwardly and outwardly extending surface portions, and said second portion walls are substantially vertical.

13. Apparatus as set forth in claim 9 in which the lower portion of said receiving means is provided with a shallow inverted V-shaped element extending along the length thereof.

14. Fruit half turnover apparatus comprising a longitudinally extending table, means on the upper surface of said table defining a longitudinally extending groove, said means including a pair of substantially vertical opposed walls having lower portions inclined laterally inwardly and downwardly, said lower portions diverging from each other to define a slot of increasing width therebetween, and longitudinally extending means subjacent said slot for receiving fruit halves passing through said slot.

References Cited in the file of this patent

UNITED STATES PATENTS

| | | |
|---|---|---|
| 2,155,612 | Morris | Apr. 25, 1939 |
| 2,337,394 | Kok | Dec. 21, 1943 |